May 24, 1932.  G. A. SHELL  1,859,995
SHOCK ABSORBER
Filed Jan. 6, 1930
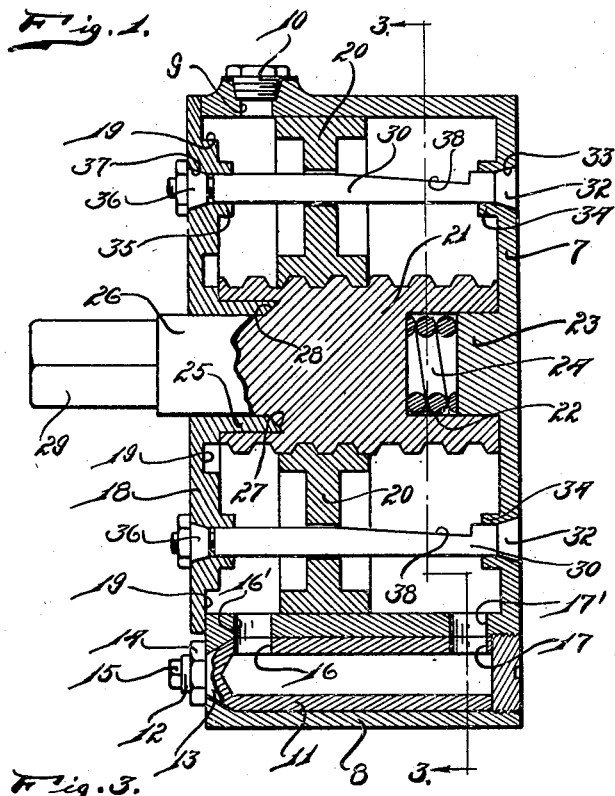
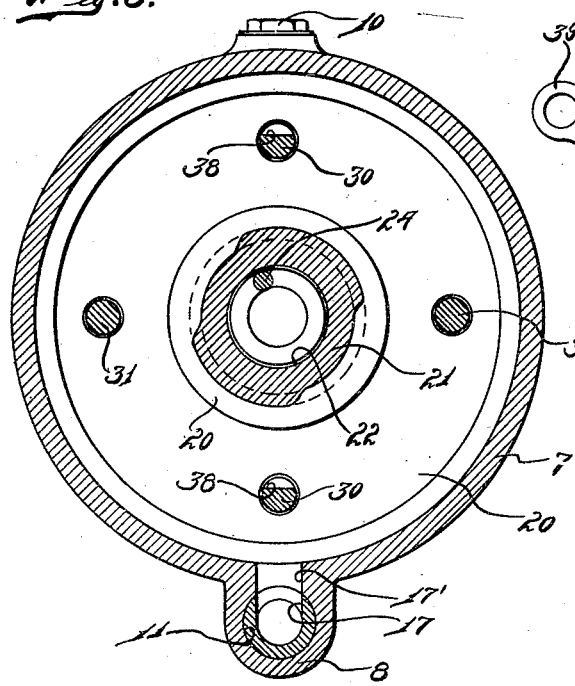
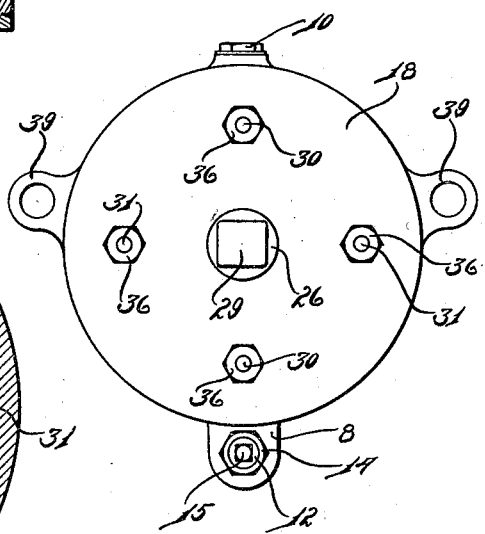
INVENTOR.
Gustave A. Shell
BY Thos. A. Donnelly
ATTORNEY Patented May 24, 1932

1,859,995

UNITED STATES PATENT OFFICE

GUSTAVE A. SHELL, OF WAYNE, MICHIGAN

SHOCK ABSORBER

Application filed January 6, 1930. Serial No. 418,721.

My invention relates to a new and useful improvement in a shock absorber or retarding device for retarding shocks, jars, and sudden relative movements of a vehicle body and a chassis or similarly situated and operated bodies.

It is an object of the present invention to provide a device of this class which will be simple in structure, economical of manufacture, and highly efficient in use.

Another object of the invention is the provision of a device which will automatically regulate the resistance.

Another object of the invention is the provision of a structure whereby a hydraulic shock absorber may be used, and so constructed and arranged as to be leak proof at all times.

Another object of the invention is the provision of a device of this class which will permit of fine adjustments so that the resistance offered may be regulated.

Another object of the invention is the provision of a device of this class which will be compact and durable in structure.

Other objects will appear hereinafter.

The invention consists in the combination and arrangement of parts hereinafter described and claimed.

The invention will be best understood by a reference to the accompanying drawings which form a part of this specification, and in which, Fig. 1 is a central vertical sectional view of the invention.

Fig. 2 is an end elevational view of the invention.

Fig. 3 is a sectional view taken on line 3—3 of Fig. 2.

The invention comprises a cup shaped casing 7 having a tubular projection 8 extending outwardly from one side thereof. A filling opening 9 is provided in one side of the casing and normally closed with the plug 10. Rotatably mounted in the projection 8 is a tubular sleeve 11 which is formed cup shaped and provided with the threaded neck 12, extending outwardly from the tapered portion 13, a nut 14 being threaded on the portion 12 to secure the sleeve 11 in position in the projection so that the tapered portion 13 will effect a liquid tight seal with the projection 8. A flat faced head 15 extends outwardly from the neck 12 whereby the sleeve 11 may be rotated by use of a suitable wrench. The interior of the sleeve 11 communicates through the openings 16, 16′, 17, and 17′ with the interior of the casing 7. A cap 18 is mounted on the casing 7 and cut away as at 19 to accommodate the axially extending portions on the piston 20 which is slidably mounted in the casing or housing 7. The piston 20 is threaded on the shaft 21 which is provided with a socket 22 for receiving the boss 23 projecting inwardly from the base of the housing or casing. A spring 24 is compressed in the socket 22. A cylindrical neck 25 projects inwardly from the cap 18 at the center thereof, the shaft 22 at its reduced portion 26 extending through this cylindrical neck. The inner end of the neck 25 is cut on a bevel to provide the bevel surface 27 which engages in a recess 28 formed in the shaft 21. A flat faced portion 29 is formed on the outer end of the reduced portion 26 of the shaft 21. Extending through the housing or casing are bolts 30 and 31, and each of these bolts is provided with a tapered head 32 engaging in the tapered opening 33 formed in the base of the casing or housing 7. A neck 34 extends inwardly from this base around the cylindrical portion of the bolt 30. The tapered head 32 serves to form a seal with the tapered opening 33 so as to prevent leakage of liquid therethrough. The cylindrical portion of the bolts also form with the portion 34 a seal. Projecting inwardly from the cap are bosses 35 snugly fitting the periphery of the bolts and tapered nuts 36 are threaded on these bolts and engage in the tapered pockets or recesses 37 formed in the cap so that a double seal is provided in the cap, around each of the bolts. As shown in Fig. 1 and Fig. 2 some of the bolts are cut away as at 38 while others are cylindrical throughout their length.

The engagement of the neck 25 in the recess 28 serves to maintain about the reduced portion of the shaft 26 a liquid tight seal and as wear is effected through a rotation of the shaft, the spring 24 serves to maintain the neck 25 pressed firmly in the recess 28 so as to compensate for the wear.

In operation the housing or casing is mounted by the lugs 39 on either the chassis or the vehicle body and a flat faced portion 29 of the shaft is connected by a suitable arm in the usual manner, to the other part of the vehicle. The sleeve 11 is rotated so as to determine the degree of registration of the openings 16 and 17 with the openings 16' and 17' so that the proper speed of flow of liquid from one side of the piston to the other side may be effected. Upon relative movement of the chassis and the vehicle the shaft 21 will be rotated thus effecting movement of the piston 20 axially of the shaft 21 and forcing the liquid from the housing or casing 7 at one side of the piston to the opposite side of the piston in the housing. When this movement begins the piston is normally at such a location on the bolts that the cut away portion 38 is extended through the piston, and as the piston moves to this cut away portion, leakage of liquid through the piston, around the bolts 30 becomes possible. This results in a rapid initial movement so that while some resistance to relative movement of the movable parts is effected at the beginning, this resistance gradually increases.

The use of the sleeve as an adjusting mechanism is one which permits of a very fine and quick adjustment.

While I have illustrated and described the preferred form of construction of my invention, I do not wish to limit myself to the precise details of structure shown but desire to avail myself of such variations and modifications as may come within the scope of the appended claims.

Having thus described my invention, what I claim as new and desire to secure by Letters Patent is:

1. In a device of the class described, a housing having a pair of spaced openings formed therein; a bypass mounted on said housing communicating through said openings with the interior thereof; a cup shaped sleeve rotatably mounted in said bypass; a tapered end on said sleeve; a threaded neck projecting outwardly from said tapered end and extending beyond said bypass; and a nut threaded on said neck for engaging said end tightly against the end of said bypass to provide a liquid tight seal, said sleeve having spaced openings formed therein for registration with said openings in said housing and rotatable on its axis for varying the area of openings in registration.

2. In a device of the class described, a housing; a cap for one side of said housing; a cylindrical neck projecting inwardly from the inner face of said cap at the center thereof and having its inner edge beveled; a rotatable member projected through said cap and extended into said housing and having a recess for reception of said neck, the base of said recess being tapered complementary with the beveled edge of said neck; and resilient means for normally pressing the inner edge of said neck into engagement with the base of said recess for effecting a liquid tight connection.

3. In a device of the class described, a housing having a pair of spaced openings formed therein; a by-pass mounted on said housing and communicating through said openings with the interior thereof; a sleeve rotatably mounted in said by-pass; a tapered end on said sleeve; a portion projecting outwardly from said tapered end and extending beyond said by-pass; and means cooperating with said portion for engaging said end tightly against the end of said by-pass to provide a liquid tight seal, said sleeve having spaced openings communicating with each other through a central passage in said sleeve and adapted for registration with said openings in said housing and rotatable on its axis for varying the area of openings in registration.

4. In a device of the class described, a housing having a pair of spaced openings formed therein; a by-pass mounted on said housing and communicating through said openings with the interior thereof; a sleeve rotatably mounted in said by-pass, and having a pair of openings formed therein in spaced relation to each other and adapted for registration with said openings in said housing and communicating with each other through a passage formed in said sleeve, said sleeve being rotatable on its axis for varying the area of the openings in registration, one end of said sleeve being tapered and engageable with a tapered surface in said by-pass; and means for forcing the taper of said sleeve into engagement with the tapered surface of said by-pass to provide a liquid tight seal.

In testimony whereof I have signed the foregoing specification.

GUSTAVE A. SHELL.